United States Patent
Laib et al.

(10) Patent No.: US 9,517,845 B2
(45) Date of Patent: Dec. 13, 2016

(54) MOVABLE PERSONNEL PLATFORM FOR UNLOADING A UNIT LOAD DEVICE

(71) Applicant: Deutsche Post AG, Bonn (DE)

(72) Inventors: Jason Laib, Erlanger, KY (US); Travis Cobb, Erlanger, KY (US); Mark Webster, Hubertus, WI (US); Mark Veasy, Bonn (DE)

(73) Assignee: Deutsche Post AG, Bonn (DE)

( * ) Notice: Subject to any disclaimer, the term of this patent is extended or adjusted under 35 U.S.C. 154(b) by 537 days.

(21) Appl. No.: 14/026,716

(22) Filed: Sep. 13, 2013

(65) Prior Publication Data

US 2015/0078866 A1   Mar. 19, 2015

(51) Int. Cl.
*B64F 1/32* (2006.01)
*B65G 69/22* (2006.01)

(52) U.S. Cl.
CPC ............... *B64F 1/32* (2013.01); *B65G 69/22* (2013.01)

(58) Field of Classification Search
CPC ............. B64F 1/32; B65G 69/22; B65G 69/24
See application file for complete search history.

(56) References Cited

U.S. PATENT DOCUMENTS

| | | | |
|---|---|---|---|
| 3,031,027 A * | 4/1962 | Mitchell | B66F 11/04 134/84 |
| 3,184,045 A * | 5/1965 | Fry | B60P 1/38 198/316.1 |
| 3,499,562 A * | 3/1970 | Phillips | B64F 1/32 180/89.1 |
| 3,655,075 A | 4/1972 | Carder et al. | |
| 3,667,591 A | 6/1972 | Sykes | |
| 3,825,107 A | 7/1974 | Cary et al. | |
| 3,826,353 A | 7/1974 | Greasley | |
| 4,312,619 A | 1/1982 | Anderson et al. | |
| 4,787,111 A * | 11/1988 | Pacek | B65G 69/22 14/71.1 |
| 5,346,352 A | 9/1994 | Ito | |
| 5,476,360 A | 12/1995 | Liljevik | |
| 5,642,803 A | 7/1997 | Tanaka | |

(Continued)

FOREIGN PATENT DOCUMENTS

DE         10308680 A1      9/2004

OTHER PUBLICATIONS

Machine Translation of DE10308680A1 by Lexis Nexis Total Patent on May 15, 2015.

*Primary Examiner* — Jonathan Snelting
(74) *Attorney, Agent, or Firm* — Woodard, Emhardt, Moriarty, McNett & Henry LLP

(57) ABSTRACT

The invention relates to an unload access system for an unit load device, comprising a framework, the framework delimiting a cargo space arranged on a ground load deck and the framework comprising an unload deck for unloading shipments out of the unit load device, whereby the unload deck is arranged distant above the ground load deck and extends in an offset plane adjacent to the cargo space, the unload deck comprises a movable platform, and the platform extends coplanar with the unload deck and is movable between a retracted position and a maximum extracted position, whereby in the maximum extracted position the platform overlaps at least partly the cargo space by extending into the cargo space and in the retracted position the platform does not overlap the cargo space.

18 Claims, 3 Drawing Sheets

(56) References Cited

U.S. PATENT DOCUMENTS

| | | | |
|---|---|---|---|
| 5,743,217 | A | 4/1998 | Jerome |
| 6,286,629 | B1 | 9/2001 | Saunders |
| 6,447,234 | B2 | 9/2002 | Sinn et al. |
| 6,481,563 | B1 | 11/2002 | Gilmore |
| 6,564,751 | B2 | 5/2003 | Anderson et al. |
| 7,234,590 | B1 | 6/2007 | Le Borgne |
| 7,281,496 | B2 | 10/2007 | Calabria et al. |
| 7,305,748 | B2 | 12/2007 | Sprague et al. |
| 8,596,947 | B1 | 12/2013 | Stenzel |
| 8,801,358 | B2 | 8/2014 | Kussner |
| 2008/0230321 | A1 | 9/2008 | Csaszar et al. |
| 2013/0213744 | A1* | 8/2013 | Foley .................. B66F 7/0625 187/276 |
| 2013/0287538 | A1 | 10/2013 | Nyquist |

* cited by examiner

MOVABLE PERSONNEL PLATFORM FOR UNLOADING A UNIT LOAD DEVICE

The invention relates to an unload access system for a unit load device, comprising a framework, the framework delimiting a cargo space arranged on a ground load deck and the framework comprising an unload deck for unloading shipments out of the unit load device. The invention further comprises a method for unloading a unit load device with the unload access system.

A unit load device, often abbreviated as ULD, is a container or pallet used to load luggage, freight, shipments and/or mail on aircrafts. ULDs are preferably used for express shipments to be delivered by said aircrafts, as the ULD allows a larger quantity of cargo respectively shipments to be bundled into a single unit i.e. into the unit load device. The ULD can then be loaded into an aircraft respectively out of an aircraft by specialized motorized means, as known from prior art. Since the shipments are bundled into a single unit this leads to few pieces to load respectively unload to the aircraft and thus saves time and effort.

ULD containers, also referred to as cans or pods, are most often closed containers made of aluminum having at least one door and sometimes even build-in refrigeration units. ULD pallets are often provided with rubbed sheets of aluminum with rims to lock onto so-called cargo net lugs.

Aviation unit load devices are standardized in several types, for example container types LD1, LD2, LD3, LD6, LD8 and LD11, which have different width, but the same depth and height. The most common container type is called LD3 having a volume of 4.5 m$^3$. For example, a Boeing 777 can load up to 44 LD3s.

Especially if shipments having small dimensions are placed in a unit load device an operator grabbing these shipments for unloading the ULD has to reach with his hands a long way into the interior of the ULDs, so sometimes up to two or more meters for reaching the edges of the ULD. Thus, the unloading of shipments out of a ULD is not seldom very uncomfortable and takes an operator lot of time. The unloading may become very expensive especially if shipments having small dimensions are spread around the complete footprint of the unit load device.

It is therefore an object of the invention to provide a system and associated method for improving the access of the inside of an aviation unit load device such that the unloading of shipments and/or cargo stored in the unit load device can be done in a safe and ergonomic manner, and furthermore leads to a time and therefore also cost reduction for the complete unloading.

The object is solved by the features of the independent claims. Preferred embodiments are detailed in the dependent claims.

Thus, the object is solved by an unload access system for a unit load device, comprising a framework, the framework delimiting a cargo space arranged on the ground load deck and a framework comprising an unload deck for unloading shipments out of the unit load device, whereby the unload deck is arranged distant above the load deck and extends in an offset and preferably coplanar plane adjacent to the cargo space, the unload deck comprises a movable platform, and the platform extends coplanar with the unload deck and is movable between a retracted position and a maximum extracted position, whereby in the maximum extracted position the platform overlaps at least partly the cargo space by extending into the cargo space and in the retracted position the platform does not overlap the cargo space.

The invention therefore provides a movable platform to be used by an operator for providing improved access in unloading aviation unit load devices. The platform, also referred to as movable personnel platform, is provided movably on the unload deck and comprises, for example, a motorized means for moving the platform between the retracted position and the maximum extracted position.

Preferably, the platform, as well as the unload deck, comprises a metal sheet or similar means, which is designed such that an operator can stand on the platform. More preferably, the cargo space is designed such that a unit load device can be placed on it, being delimited by the framework. Further preferably, the unload deck is attached to the framework, for example in a height of three to five meters above the ground load deck. More preferably, the unload deck, the cargo space and the ground load deck are arranged in coplanar planes, whereby the cargo space and the ground load deck share the same coplanar plane and the unload deck is arranged in an offset plane above the ground load deck and the cargo space. Preferably, the unload deck is provided walkable i.e. that an operator is able to walk on the unload deck for unloading shipments. In a further embodiment the cargo space is provided drivable i.e. that a motorized means, e.g. a lift truck, can drive at least partly into the framework for placing the unit load onto the cargo space. Thus, the unit load device can either be placed manually onto the cargo space or by a motorized means.

As the platform preferably extends coplanar with the unload deck, an operator walking onto the unload deck basically feels no difference on the so provided underground. More preferably, the insertion direction for placing a unit load device onto the cargo space is opposite the direction of moving the platform from the retracted position into the extracted position. Preferably, the unit load device can be positioned by a human means i.e. an operator across a caster respectively roller deck into the cargo space being delimited by the framework. Alternatively, unit load device may be placed by a lift truck onto the cargo space.

According to another preferred embodiment the platform is fixable at any position between the retracted position and the maximum extracted position. Preferably, the platform is seamlessly movable between the retracted position and the maximum extracted position, which has the advantage, that an operator, depending on the loading level of an unit load device, on the type of shipments etc., can move the platform forth and back and stop it at an appropriate point for ergonomically unloading the shipments out of the unit load device.

According to another preferred embodiment, the platform comprises a rectangular surface that extends seamlessly with the unload deck, the platform is guided on two sides by roller rails and comprises a motorized means for moving the platform. Such embodiment has the advantage that the platform seamlessly integrates with the surface of the unload deck such that an operator can easily walk onto the platform. In this regard the platform, while referring to the advantageous feature of moving a platform forth and back into the interior of the unit load device, has been named as "magic carpet".

The platform may have, for example, dimensions of six feet by nine feet, while a platform itself might be provided as a ¼ inch diamond plate having strut members, e.g. at its sides. The platform is preferably configured such that a maximum load of 720 LBS can be carried, while at its far most extracted end still a load of 500 LBS can be carried, which allows two operators to stand at the utmost extracted end of the platform.

According to another especially preferred embodiment the framework comprises an especially designed elevator adapted for vertically elevating the unit load device between the load deck and the unload deck such that the unit load device is stoppable at any intermediate stop locations. Such embodiment provides for a very efficient and ergonomic unloading of so-called "mixed" shipments comprising both conveyable shipments as well as forkable shipments that can only be moved with lift truck. This way the operator avoids to unnatural bend down and unsafe work functions, as the invention provides very ergonomic unloading of unit load devices.

In particular, a human means may place the unit load device onto the cargo space such that the elevator can then elevate the ULD from the ground load deck up to the unload deck. Onto the unload deck the ULD can be unloaded by an operator using the movable personnel platform. Therefore, if the ULD is elevated up to the unload deck and opened, the operator may move the platform from its retracted position in an extracted position and thereby moving the platform at least partly into the interior of the unit load device.

The operator may then walk towards the extracted end of the platform and may easily and ergonomically unload conveyable shipments out of the ULD. When the unloading of the utmost layer of shipments has been finished, the operator may bring the unit load device a bit higher by using the elevator, which can be stopped at any intermediate stop locations or preferably at concrete stop locations. Having done so, the second utmost layer of shipments is provided at the same height about the ground load deck as before unloaded utmost layer of shipments.

When the unloading of conveyable shipments has been finished, the operator may move the platform from its extracted position into the retracted position such that the platform does not reach anymore into the interior of the unit load device.

Thereafter the elevator may bring down the ULD from the unload deck towards the ground load deck such that a lift truck may unload forkable shipments out of the unit load device.

In sum, the elevator provides in combination with the movable platform for a very efficient and ergonomic unloading of unit load devices, whereby tests have shown that the unloading time could be reduced from 40 minutes with prior art systems to only 18 minutes by using the unload access system according to the invention. This means that the system provides for a time reduction of more than 50% and associated cost reductions as well.

According to another preferred embodiment the system comprises a programmable logic controller for controlling the movement of the platform and of the elevation, whereby the programmable logic controller only allows for moving the platform from the retracted position to an extracted position if the elevator is elevated to the unload deck. The programmable logic controller may further be adapted for stopping the elevator at any intermediate stop locations and/or at discrete stop locations, preferably around the height of the unload deck above ground. Therefore, the programmable logic controller might be adapted to stop the elevator at intermediate stop locations of 0.5 cm, 1 cm, 2 cm and/or 5 cm and/or at an infinite number of stops. Thus, the programmable logic controller allows for a very efficient operation of the platform and the elevator.

According to another preferred embodiment the cargo space and/or the elevator comprises rollers for loading and unloading the unit load device into and out of the elevator. It is further preferred that the cargo space and/or the elevator comprises a plurality of rollers arranged behind one another and/or in parallel rows in a drivable insertion direction into the elevator. The rollers, which are preferably provided as long rolls, allow for a very easy and simple insertion and movement of the unit load device onto the cargo space respectively into the elevator.

The elevator may further comprise grab means, which are adapted for grabbing the unit load device in order to elevate the unit load device from the ground load deck up to the unload deck. The grab means are preferably provided such that unit load devices with different dimensions can be grabbed. More preferably, the framework comprises four vertically extending supports guiding an elevator and delimiting the cargo space. In this regard it is preferred that the elevator is attached to the four vertically extending supports and that the elevator comprises four grab means, whereby each two of them are arranged on two opposite sides in insertion direction into the elevator.

According to another preferred embodiment the unload deck comprises a foldable conveyer, which can be folded out into the framework. Preferably, the conveyer is provided as a roller conveyer or alternatively as a belt conveyer. More preferably, the conveyer is arranged above the personnel platform, preferably such that two operators may stand on the extracted movable platform each on one side of the folded out conveyer for unloading shipments out of the unit load device.

Such conveyer is especially advantageous as it further improves the unloading of shipments out of the ULDs in combination with the personnel platform. While standing on the extracted part of the personnel movable platform, the operator may simply grab a shipment from the interior of the unit load device and place it onto the folded out part of the conveyer, which is preferably folded out into the interior of the unit load device being elevated up to the unload deck. This way the operator may unload very easy and ergonomically shipments from the unit load device without the need of walking, carrying a grabbed shipment in his hand, between the unit load device and a distant conveyer, as known from prior art systems.

According to another preferred embodiment the framework further comprises a vertically slidable load deck door arranged on the load deck and/or a vertically slidable unload deck door arranged on the unload deck, whereby the movable platform is configured such that a movement from the retracted position in an extracted position is only possible if the unload deck door is open. The doors are preferably provided as a single panel vertical acting gate, which prevents the operator from falling down from the unload deck into the framework respectively from preventing an operator present on the ground load deck from walking into the cargo space if the unit load device is elevated up to the unload deck. Such doors provide for an improved security for the operation of the unload system. Preferably, the unload deck is arranged on the opposite side of the framework which faces the insertion direction of the unit load device into the elevator.

According to another preferred embodiment the system comprises the unit load device, whereby, if the unit load device is elevated to the load deck, the extracted platform extends into the unit load device. Preferably, the extracted platform extends into the interior of the unit load device. The unit load device preferably comprises a door, which needs to be opened first such that the extracted platform can extend into the interior of the unit load device. More preferably, the unit load device is positioned within the framework respectively elevated by the elevator such that the door of the unit load device faces the unload deck respectively the platform. According to another preferred embodiment, the extension of the cargo space equals and/or is greater as the footprint of the unit load device. More preferably, the framework and the unit load device comprise dimensions such that the framework is slightly greater than the dimensions of the unit load device allowing the unit load device to be placed within the framework.

The object of the invention is further addressed by a method for unloading a unit load device, with an unload access system as described before, comprising the steps of: a) positioning the unit load device on the cargo space on the ground load deck preferably with the drivable and/or a motorized means, b) elevating the unit load device from the ground load deck to the above unload deck with the elevator, and c) moving the platform from the retracted position into an extracted position.

According to a further preferred embodiment the method comprises the step of: c') moving the platform in step c) with a speed of 30 fpm. According to another preferred embodiment, the method comprises the steps of: d) moving the platform from the extracted position into the retracted position, e) elevating the unit load device from the above unload deck to the ground load deck, and f) unloading the unit load device preferably with the drivable and/or motorized means. In an alternative embodiment the method does not comprise step a) and/or step b).

Such method provides for a very efficient and ergonomic unloading of shipments being shipped in an unit load device. As an example, a lift truck positions the unit load device unloaded from an aircraft on the cargo space on the ground load deck during step a). The elevator then elevates the unit load device up to the unload deck such that the unloading of conveyable shipments transported the unit load device can be performed by an operator. After opening the door of the unit load device the movable personnel platform can be moved during step c) from its retracted position into its extracted position thereby reaching with its extracted end into the interior of the unit load device. This enables the operator to unnaturally stoop down less for grabbing shipments compared to prior art systems as due to the extracted platform the operator is much closer to the shipments than just standing onto the unlocked deck and grabbing into the interior of the unit load device.

The platform and the elevator are both motorized such that the handling is very easy for the operator. After unloading all conveyable shipments from the unit load device, the operator may close the door of the unit load device and move the platform during step d) from its extracted position into the retracted position such that during step e) the unit load device can be elevated from the unload deck down to the ground load deck. In a last step f) forkable shipments can easily be unloaded from the unit load device by using the lift truck. Preferably, such steps are performed when the manual unloading of conveyable shipments has been finished and the unit load device is still positioned in the framework optimizing the use of the framework and avoiding having to reposition the unit load device to unload the forkable shipments.

These and other objects of the invention will become apparent in connection with the following description in conjunction with the accompanying drawings:

FIG. 1 shows an unload access system according to a preferred embodiment of the invention in a perspective view and FIG. 2 shows a side view.

Figure 1:
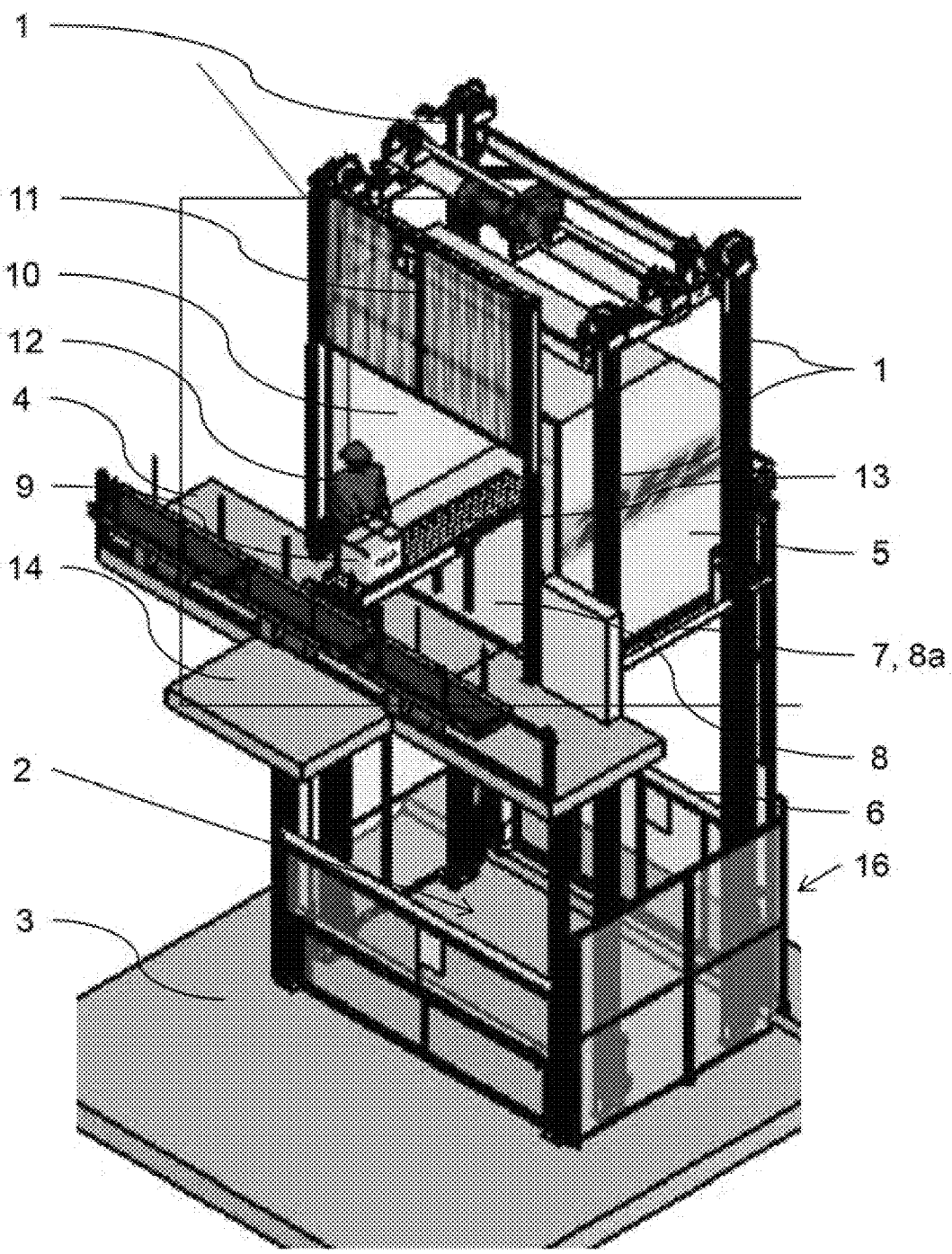
FIG. 1 shows an unload access system in a perspective view according to a preferred embodiment of the invention, FIG. 2 show the system according to FIG. 1 in a side view, and FIG. 3 show a personnel movable platform in a perspective view according to the preferred embodiment of the invention.

The unload access system shown in FIG. 1 comprises a framework 1, which is made-up by four vertically extending supports delimiting a cargo space 2 arranged on a ground load deck 3. Attached to the framework 1 is a walkable unload deck 4, which surface extends parallel respectively in a coplanar and offset plane to the ground load deck 3. It can be seen that the unload deck 4 is attached to only one side of the framework 1 delimiting the rectangular cargo space 2.

The cargo space 2 comprises a footprint such that an aviation unit load device 5, for example an unit load device 5 having the container type LD3 with a volume of 4.5 m$^3$ and an overall width of 201 cm, a depth of 153 cm and a height of 163 cm can be placed onto the cargo space 2.

Attached to the framework 1 on the ground load deck 3 is a vertically slideable load deck door 6, acting as a gate for allowing and preventing, respectively, a unit load device 5 to be placed onto the cargo space 2 by an operator 12 or a lift truck, not shown. FIG. 1 shows such load deck door 6 in its closed position.

The framework 1 furthermore comprises an elevator 7 for elevating the unit load device 5 from the ground load deck 3 up to the above arranged unload deck 4 and down again. The elevator is adapted for vertically elevating the unit load device 5 such that the unit load device 5 is stoppable at any intermediate stop location.

This means that a planar base 8 of the unit load device 5 supporting the shipments 9 can be elevated up to the unload deck 4 such that the surface of the planar base 8 becomes coplanar with the surface of the unlocked deck 4 as shown in FIG. 1, while it is also possible to stop the elevator at an elevation above or beneath the unload deck 4 such that the surface of the planar base 8 shows a positive or negative offset towards the surface of the unload deck 4. A programmable logic controller 8a is provided for controlling the offset, which might be controllable in discrete steps of 0.5 or 1 cm above or beneath the unload deck.

In order to unload shipments 9 from an interior of the unit load device 5, the opening 10 of the unit load device 5 has to be opened first, as shown in FIG. 1. Thereafter, or in parallel, a vertically slidable unload deck door 11 has to be opened, as also shown in FIG. 1. Following this, an operator 12 can start the unloading of the shipments 9. The operator 12 is thereby supported by a foldable conveyer 13, which is folded out of the framework 1 and into the interior of the unit load device 5 by reaching into the opening 10. Thereby, the conveyer 13 is foldable such that in its folded position the conveyer 13 does not extend anymore into the framework 1 respectively into the unit load device 5.

Figure 2:
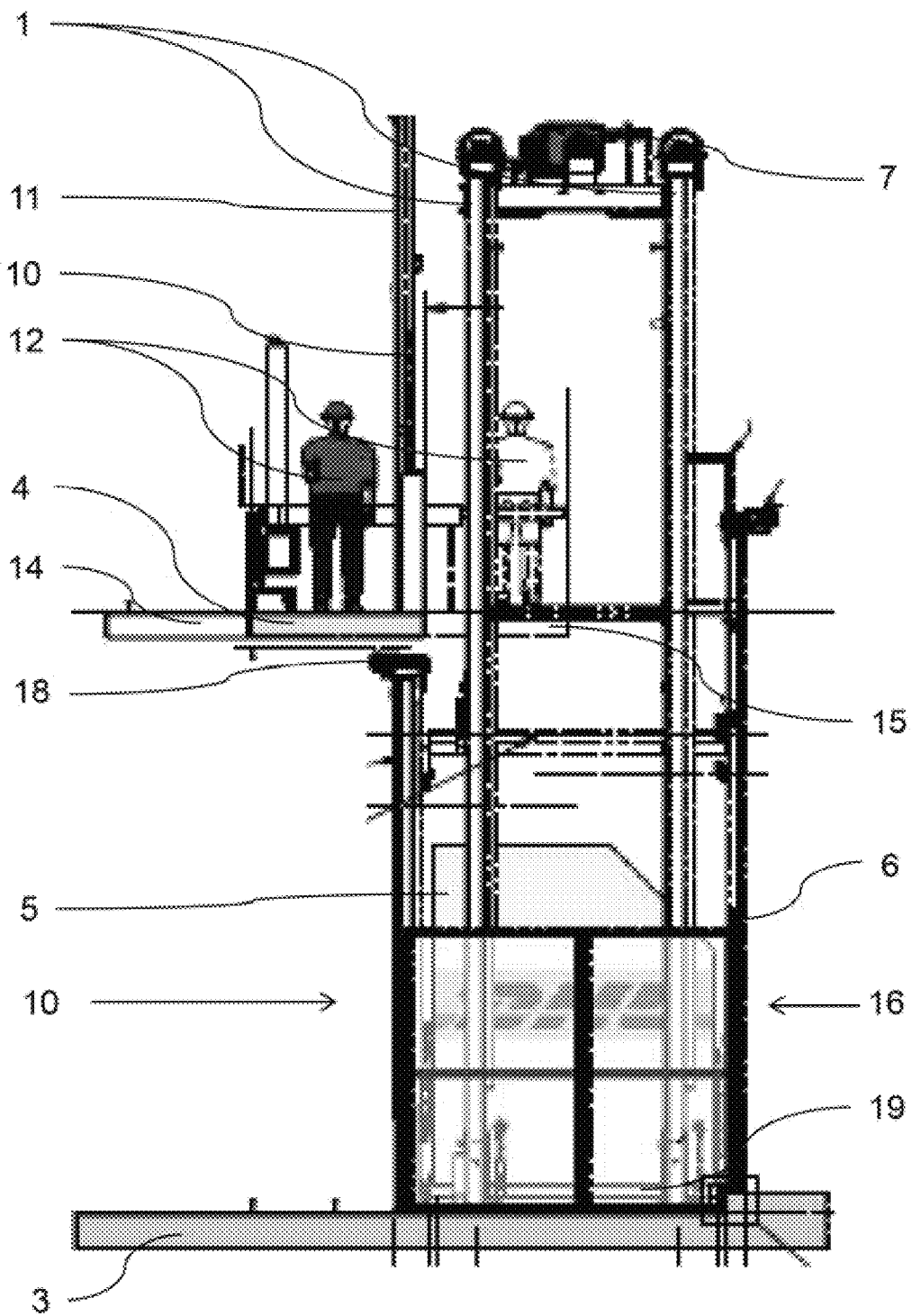
Figure 3:
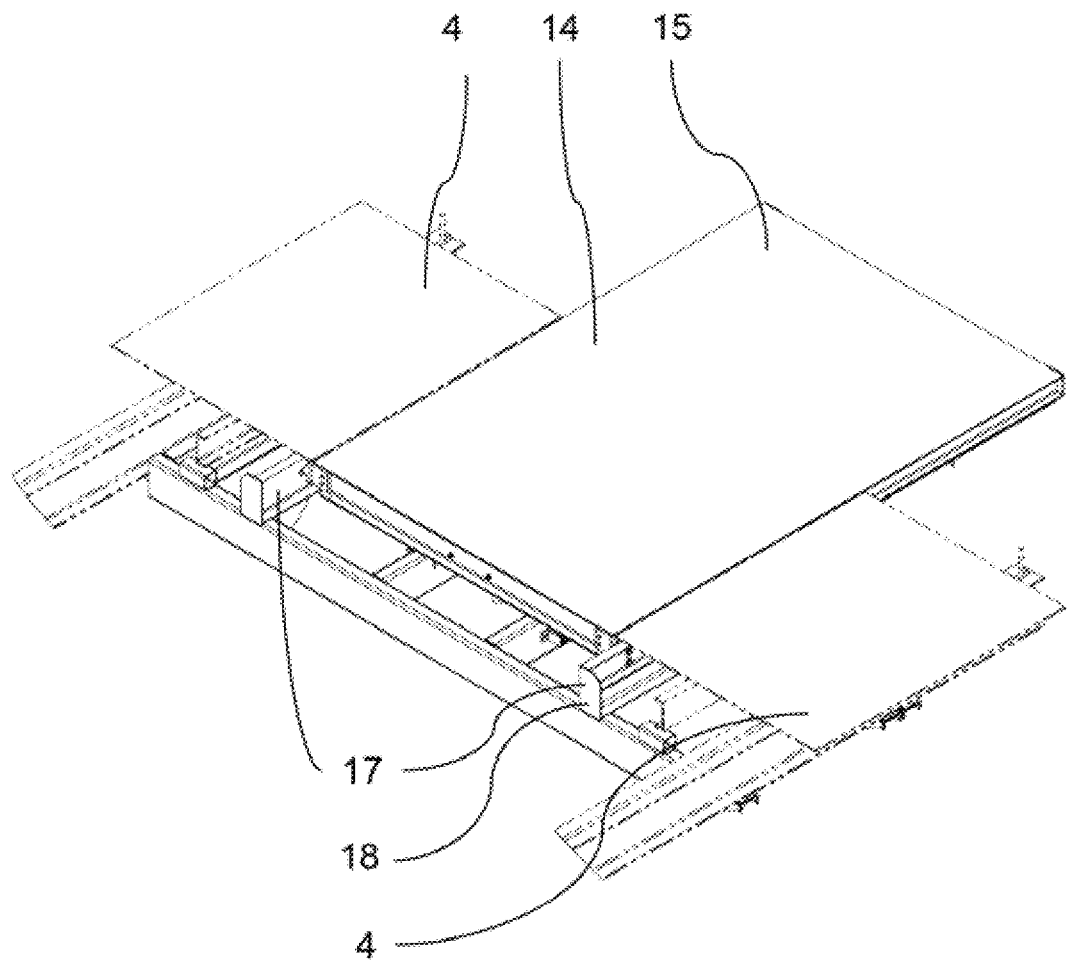
FIG. 3 shows a perspective view of the later detailed movable personnel platform according to the preferred embodiment of the invention.

For further supporting the unloading of the shipments 9 the system comprises a movable platform 14, which is arranged on the unload deck 4 such that the platform 14 extends coplanar with the unload deck 4, i.e. the surface of the platform 14 extends coplanar with the surface of the unload deck 4. The platform 14 is movable between a retracted position, shown in FIG. 1, and a maximal extracted position 15, shown as dashed line in FIG. 2 by a motorized means. Thereby, the platform 14 is movable between its positions 15 parallel to the insertion direction 16 of an unit load device 5 into the framework 1. FIG. 3 also shows the extracted position 15 of the moveable platform 14 and the moveable platform 14 in detail. The platform is guided on two opposite sides by roller rails 17 and powered by a motorized means 18.

In the extracted position 15 the movable platform 14 extends into the cargo space 2 respectively into the interior of an unit load device 5 elevated up to the unload deck 4. Thus, both the conveyer 13 and the movable platform 14 extend into the unit load device 5, as shown with the dashed line in FIG. 2 such that the operator 12 can stand on the extracted part of the movable platform 14 for unloading shipments out of the interior of the unit load device 5.

After finishing the unloading of shipments 9 from the unit load device 5 elevated up to the unload deck 4, the movable platform 14 can be moved from its extracted position 15 into its retracted position not overlapping anymore the cargo space 2 such that, if the conveyer 13 is folded, the unit load device 5 can be elevated down from the unload deck 4 to the ground load deck 3.

In this position, after opening the load deck door 6, the lift truck can unload forkable shipments 9 from the unit load device 5. After completely unloading the unit load device 5, the unit load device 5 can be removed out of the framework 1 by the lift truck. For supporting the placing respectively and of the unit load device 5 into and out of the framework 1 the cargo space 2 and/or the elevator 7 comprise rollers 19 arranged one behind one another and in parallel rows in the insertion direction 16 of the unit load device 5 into the framework 1.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS

Framework 1
Cargo space 2
Ground load deck 3
Unload deck 4
Unit load device 5
Load deck door 6
Elevator 7
Planar base 8
Programmable logic controller 8a
Shipment 9
Opening 10
Unload deck door 11
Operator 12
Conveyer 13
Movable platform 14
Extracted position 15
Insertion direction 16
Roller rails 17
Motorized means 18
Rollers 19

The invention claimed is:

1. Unload access system for an unit load device, comprising a framework, the framework delimiting a cargo space arranged on a ground load deck, wherein the cargo space is adapted to receive the unit load device, and the framework comprising an unload deck for unloading shipments out of the unit load device and an elevator adapted for vertically moving the unit load device between the ground load deck and the unload deck, whereby
   the unload deck is attached to the framework and is arranged distant above the ground load deck at a fixed height relative to the frame and extends in an offset plane adjacent to the cargo space,
   the unload deck comprises a movable platform, and
   the platform extends coplanar with the unload deck and is movable between a retracted position and a maximum extracted position, whereby
   in the maximum extracted position the platform overlaps at least partly the cargo space by extending into the cargo space and
   in the retracted position the platform does not overlap the cargo space.

2. The unload system according to claim 1, whereby the platform is fixable at any position between the retracted position and the maximum extracted position.

3. The unload system according to claim 1, wherein the platform comprises a rectangular surface that extends seamlessly with the unload deck, and wherein the platform is guided on two sites by roller rails and comprises a motorized means for moving the platform.

4. The unload system according to claim 1, wherein the elevator and the unit load device are stoppable at any intermediate stop location between the ground load deck and the unload deck.

5. The unload system according to claim 4, whereby the cargo space and/or the elevator comprises rollers for loading and unloading the unit load device into and out of the elevator.

6. The unload system according to claim 4, whereby the cargo space and/or the elevator comprises a plurality of rollers arranged behind one another and/or in parallel rows in a drivable insertion direction into the elevator.

7. The unload system according to claim 4, wherein the unload system is adapted to:
   a) position the unit load device on the cargo space on the ground load deck,
   b) elevate the unit load device from the ground load deck to the above unload deck with the elevator, and
   c) move the platform from the retracted position into an extracted position.

8. The unload system according to claim 7, wherein the unload system is adapted to:
   c') move the platform in step c) with a speed of 30 fpm.

9. The unload system according to claim 7, wherein the unload system is adapted to:
   d) move the platform from the extracted position into the retracted position,
   e) elevate the unit load device from the above unload deck to the ground load deck, and
   f) unload the unit load device while the unit load device is elevated above the unload deck.

10. The unload system according to claim 1, further comprising a programmable logic controller for controlling movement and elevation of the platform, whereby the programmable logic controller only allows for moving the platform from the retracted position to an extracted position if the elevator is elevated to the unload deck.

11. The unload system according to claim 1, wherein the unload deck comprises a foldable conveyer, which can be folded out into the framework.

12. The unload system according to claim 1, wherein the platform comprises a vertically slidable load deck door arranged on the ground load deck and/or a vertically slidable unload deck door arranged on the unload deck, whereby the moveable platform is configured such that a movement from the retracted position in a maximum extracted position is only possible if the unload deck door is opened.

13. The unload system according to claim 1, further comprising a unit load device, whereby, if the unit load device is elevated to the unload deck, the platform, in the maximum extracted position, extends into the unit load device.

14. The unload system according to claim 1, wherein the framework encloses the cargo space and the load deck.

15. The unload system according to claim 14, wherein the unload deck is attached to an outer side of the framework.

16. The unload system according to claim 1, wherein the unload deck is rigidly attached to the framework.

17. The unload system according to claim 16, wherein the unload deck does not overlap the cargo space.

18. The unload system according to claim 1, wherein the unload system is configured to permit transferring the unit load device into and out of the cargo space.

* * * * *